March 1, 1960 W. A. STOVER 2,927,061
ABSORPTION OIL PURIFYING
Filed July 26, 1957
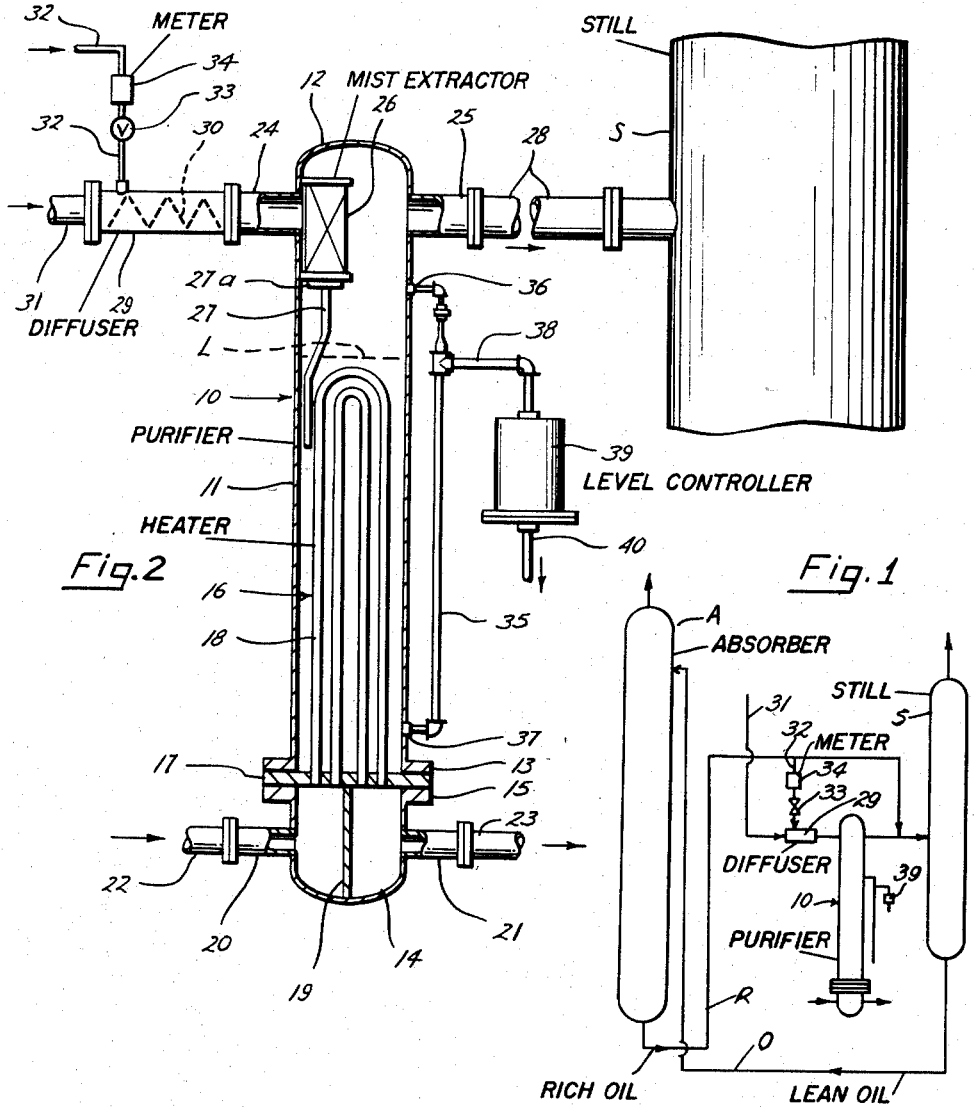
William A. Stover
INVENTOR.

2,927,061

ABSORPTION OIL PURIFYING

William A. Stover, Tulsa, Okla., assignor to Petroleum Engineering, Incorporated, Dallas, Tex., a corporation of Delaware Application July 26, 1957, Serial No. 674,353

7 Claims. (Cl. 196—115)

This invention relates to improvements in the purifying of absorption menstruums employed in the absorption of desirable constituents from gases such as natural gas, casing-head gas, refinery gas, coal gases, and the like.

In the conventional absorption process for the recovery of desirable constituents from gases, a hydrocarbon absorption menstruum, generally termed "absorption oil," is circulated in contact with gas or vapors to absorb therefrom the desired constituents. The absorption oil containing the absorbed constituents and termed "rich oil," is then introduced into a still and the absorbed constituents stripped from the absorbent by contact with the heating medium, such as steam, and the absorbent, after stripping, termed "lean oil," is cooled and returned to the absorber.

In the course of the repeated contacts of the absorption oil with gas, the oil will become contaminated with foreign matter and relatively high boiling materials carried by the gas. Since these contaminating materials are not vaporizable at the temperature of the stripping of the rich oil, they will concentrate in the oil and eventually reduce the absorption efficiency of the oil and produce deposits in the equipment which reduces the efficiency thereof.

Conventional purification systems, such as that disclosed in my U.S. Patent 2,196,878, purify the circulating oil by diverting a small proportion of the stream of oil passing between the absorber and the still and by vaporizing this small portion with process steam or other vaporous stripping medium, particularly that employed in stripping the rich oil in the still. The contact of the small stream of oil with the process stream or vaporous stripping medium evaporates the bulk of the oil and returns it to the still with the vapors of the stripping medium and thereby returns this vaporized material to the system. The small proportion of heavy residue separated in the purifying system remains in the purifier vessel since it is too heavy to be vaporized by the stripping medium, and is withdrawn at intervals from the system.

The present invention has for its principal object certain improvements in the earlier systems. More particularly in the method and means by which the small stream of absorbent is contacted with the vaporizing medium in order to produce a more efficient purification operation.

An important object is the provision of an improved apparatus which greatly reduces the cost of the purifying equipment and which provides a continuous operating process which requires less attention than the present purifying systems.

Other and more specific objects and advantages of this invention will become more readily apparent from the following detailed description when read in conjunction with the accompanying drawing which illustrates apparatus in accordance with an embodiment of the present invention.

In the drawing:

Fig. 1 is a flow diagram of a conventional absorption system employing a purifying apparatus in accordance with this invention; and Fig. 2 is an enlarged view, partly in section, of the purifying apparatus.

The purifying unit, designated generally by the numeral 10, includes a generally tubular vessel or casing 11 vertically disposed and relatively narrow in diameter as compared with its length. Casing 11 is provided at its upper end with a rounded head 12 and at its lower end with an annular flange 13 to which is connected a lower head 14 having an end flange 15 for connection to flange 13. A coil-type heater, designated generally by the numeral 16, is removably inserted longitudinally into the interior of casing 11 through its lower end and is provided with a flanged tube sheet 17 by which the heater is secured between flanges 13 and 15 in the well-known manner. Heater 16 has pipe coils 18, the ends of which open through tube sheet 17 and communicate with the interior of head 14. The latter is provided with a vertical baffle 19 which extends transversely thereof and forms a divider which intersects tube sheet 17 in order to separate the ends of the pipe coils from each other. An inlet connection 20 communicates with the interior of head 14 on one side of baffle 19, and an outlet 21 communicates with the interior of head 14 on the opposite side of baffle 19. With this arrangement it will be understood that heating fluid, such as steam, may be introduced through a supply pipe 22 into inlet 20 and thence into the ends of pipe coils 18 on one side of baffle 19, the heating medium then flowing out the opposite ends of pipe coils 18 on the opposite side of baffle 19 into head 14 and thence through outlet 21 and a pipe 23 to a suitable place of disposal. Near the upper end of casing 11, there are provided inlet and outlet nozzles 24 and 25, respectively which communicate with the interior of the casing at substantially opposite points. Inlet nozzle 24 communicates interiorly of casing 11 with a mist extractor 26, which may be of any conventional and well-known type designed to knock out liquid particles or droplets from a body of vapor carrying the same. A drain pipe 27 connects to a well 27a at the lower end of mist extractor 26 and extends downwardly therefrom to a point in the interior of casing 11 which is well below the level of a body of liquid L maintained in casing 11 and at a height sufficient to fully immerse pipe coil 18. Outlet nozzle 25 is connected by means of a pipe 28 into a still S, of any conventional type, in which rich oil is stripped by means of a hot vaporous stripping medium to separate the absorbed constituents therefrom. Inlet nozzle 24 has connected thereto a tubular conduit section 29, which I have termed a "diffuser," and which is provided internally with baffles 30 of any suitable or conventional form adapted to effect efficient intimate mixing of a vaporous stripping medium, such as steam, which is introduced to the outer end thereof through a supply pipe 31 and a small volume stream of absorption oil continuously introduced into the interior of the diffuser near its forward end through a conduit 32. The latter is equipped with a control valve 33 and a meter 34 of any suitable and generally conventional form adapted to continuously measure the quantity of liquid passing therethrough.

Casing 11 has mounted on the outside thereof an equalizing pipe 35, the upper end of which communicates with the interior of casing 11 above the body of liquid L through a connection 36, and the lower end communicates with the interior of casing 11 at a point near the lower end of liquid L through a connection 37. A branch outlet 38 is provided in pipe 35 at a point opposite the level at which liquid L is to be maintained in casing 11, and a liquid discharge trap 39 is connected into branch pipe 38, trap 39 being of the well-known conventional automatic discharging type adapted to discharge liquid through a discharge connection 40 whenever the level of liquid in casing 11 exceeds the level desired to be maintained therein through branch pipe 38.

The apparatus described operates in the following manner: A small quantity of absorption oil, which may be either lean or rich oil, is continuously diverted from the main circulating stream thereof flowing between still S and a conventional oil absorber A through a rich oil line R and a lean oil line O. As shown in Fig. 1, the oil to the purifying unit 10 is diverted from rich oil line R through pipe 32, the quantity thereof being metered through meter 34 under the control of valve 33 to regulate the quantity thereof and is discharged into the forward end of diffuser 29 where it is brought into direct intimate contact with process steam which is introduced into the diffuser through pipe 31. The quantity of oil which is thus introduced into contact with the process steam is regulated so as to be substantially fully vaporized by the quantity of process steam with which it is contacted. The absorption oil and steam are thoroughly mixed and agitated by the baffles 30 in passage through the diffuser 29 in order that the heat of the process steam may effectively vaporize the bulk of the absorption oil. The mixed stream of vapors then enters casing 11, being discharged into mist extractor 26 which serves in the well-known manner to knock out or precipitate any unvaporized liquid carried by the mixed vapors. This liquid will usually comprise the high boiling impurities and detritus carried by the absorption oil, as well as some condensate from the process steam. The liquid material knocked out in the mist extractor will collect in well 27a and will be drained therefrom through drain pipe 27 into the body of liquid L below the surface thereof. A heating medium will be circulated through heater 16 and will effectively reboil the liquid L, in order to strip therefrom the remaining lighter constituents of the absorption oil and to revaporize the process stream condensated in the mist extractor. The stripped vapors and steam thus reboiled from liquid L will be remixed with the vaporous mixture passing through the mist extractor and all of the resulting admixed vapors will then flow out of the purifier through nozzle 25 and pass to still S where the process steam will serve its usual function of stripping the bulk of the rich oil, which will have been introduced into the still in the usual manner. The absorption oil vapors carried by the steam will be condensed at the proper point in the still and be re-admixed with the main stream of this oil flowing downwardly in the still.

As this process continues and heavy constituents of the absorption oil collect in the pool of liquid L, a portion thereof which tends to raise the level of liquid above the pre-set level in casing 11 will be continuously discharged therefrom through trap 39.

By the described arrangement, it will be seen that the process is a continuously operating one which employs principally the heat available in the regular quantity of the process steam flowing toward the still, supplemented by a small amount of heat from the reboiler to effect the purification of the absorption oil. Trap 39 acts to continuously withdraw heavy residual material and once the quantity of absorption oil is properly proportioned to the quantity of process steam, the purification operation operates substantially automatically and continuously with practically no attention by the operators.

By way of example, the following set of data is presented as illustrative of the procedure and the quantities of materials employed in a purification system for effecting the continuous purification in an absorption plant in which 100 gallons per minute of a conventional absorption oil is circulated at an operating pressure of 75 lbs. gauge. For this size plant only about one gallon per minute of the absorption oil need be treated in order to purify the entire stream of absorption oil circulating in the plant. The procedure and formulae calculations for this operation are as follows:

(1) The oil to be purified enters diffuser 29 where about 99% of it is vaporized by the process steam entering through pipe 31. The heat of vaporization of the oil is supplied by the process steam. Heat of vaporization for 1 g.p.m. of oil=approx. $6.8\# \times 135 \times 60 = 55,000$ B.t.u./hr. Latent heat of steam under the operating conditions is about 895 B.t.u./#. Down-flow of condensed steam from mist extractor 26 in pipe 27 would be $55,000/895$ or $61.5\#/hr.$, plus $6.8 \times 60 \times 0.01$, or about 4.1# of heavy oil per hour.

(2) Steam condensate down-flow in pipe 27 is vaporized in the heating section in the lower portion of casing 11 by heat supplied by heater 16, or about 55,000 B.t.u./hr. The latent heat of vaporization of steam at 250# abs.=826 B.t.u./#. Steam to heater 16 would be $55,000/826$ or $65.5\#/hr.$ (3) The up-flow of steam, from the heating section, will strip light ends from the heavy oil entering the heating section through drain pipe 27.

By the formula $$\frac{S}{O} = \frac{P}{M}$$

in which $S$=mols of steam per hr.
$O$=mols of oil per hr.
$P$=absolute pressure in heating section
$M$=vapor pressure of heavy oil in heating section, the up-flow of oil with the steam from the reboiler would be:

$S = 61.5/18 = 3.42$ mols of steam per hr.
$P = 75\#$ absolute steam pressure
$M = 0.5$ vapor pressure of heavy ends
$O$=mols per hr. carried by steam from the reboiler Mol wt. of oil in down-flow in pipe 27=170
Mols/hr. of heavy oil down-flow=0.024 mol/hr.

By the formula $$\frac{S}{O} = \frac{P}{M}$$

$O = \frac{3.42}{O} = \frac{75}{.5} = \frac{.5 \times 3.42}{75} = 0.0228$ mol/hr. oil carried by up-flow vapors from the reboiler (4) Heavy end discharged from trap 39 and pipe 40=

0.0240
−0.0228
―――――
.0012 mol hr.

From the foregoing, it will be seen that a relatively minute amount of dirty material is continuously withdrawn from the system and is effective, as indicated, to purify 100 gallons per minute of absorption oil circulated in the absorption plant. The very small quantity of oil which must be treated to effect the purification results in an apparatus which is quite small in its dimensions and its cost. In the example given, namely, the continuous treatment of one gallon per minute of absorption oil, casing 11 will be about 7 feet in overall length and about 8 inches in diameter. From these overall dimensions, it will be evident that the apparatus will be relatively simple and low in cost.

The heating medium used in the heater section of the apparatus will be either hot oil or steam.

It will be understood that various changes and modifications may be made in the details of the illustrative embodiment within the scope of the appended claims without departing from the spirit of this invention.

What I claim and desire to secure by Letters Patent is:
1. In an absorption recovery system including an ab- sorber and a still between which a stream of an absorption menstruum is circulated in the operation of the system, apparatus for continuously purifying the circulating menstruum, comprising, a vertically disposed generally tubular vessel having a closed upper end, an inlet passage into the upper portion of the vessel adjacent said closed upper end, conduit means communicating with the inlet passage, means for introducing a hot vaporous stripping medium into said conduit means, means for continuously introducing a minor portion of said stream of absorption menstruum into said conduit means into direct admixture with said stripping medium, means for regulating the relative volumes of said minor portion of the menstruum and said stripping medium to such as will effect vaporization of the bulk of said minor portion by the stripping medium upon admission of the admixture into the upper portion of said vessel, an outlet passage from the upper portion of the vessel at a point substantially opposite said inlet passage for discharging therefrom the admixed vapors of said minor portion and said stripping medium, mist-extractor means disposed in the upper portion of said vessel between said inlet and outlet passages, and outlet means for discharging the unvaporized residue of said minor portion from said vessel.

2. In an absorption recovery system including an absorber and a still between which a stream of an absorption menstruum is circulated in the operation of the system, apparatus for continuously purifying the circulating menstruum, comprising, a vertically disposed generally tubular vessel having a closed upper end, an inlet passage into the upper portion of the vessel adjacent said closed upper end, conduit means communicating with the inlet passage, means for introducing a hot vaporous stripping medium into said conduit means, means for continuously introducing a minor portion of said stream of absorption menstruum into said conduit means into direct admixture with said stripping medium, means for regulating the relative volumes of said minor portion of the menstruum and said stripping medium to such as will effect vaporization of the bulk of said minor portion by the stripping medium upon admission of the admixture into the upper portion of said vessel, an outlet passage from the upper portion of the vessel at a point substantially opposite said inlet passage for discharging therefrom the admixed vapors of said minor portion and said stripping medium, and outlet means for discharging the unvaporized residue of said minor portion from said vessel, and vapor-liquid separating means in the upper portion of the vessel interposed between said inlet and outlet passages.

3. In an absorption recovery system including an absorber and a still between which a stream of an absorption menstruum is circulated in the operation of the system, apparatus for continuously purifying the circulating menstruum, comprising, a vertically disposed generally tubular vessel having a closed upper end, an inlet passage into the upper portion of the vessel adjacent said closed upper end, conduit means communicating with the inlet passage, means for introducing a hot vaporous stripping medium into said conduit means, means for continuously introducing a minor portion of said stream of absorption menstruum into said conduit means into direct admixture with said stripping medium, means for regulating the relative volumes of said minor portion of the menstruum and said stripping medium to such as will effect vaporization of the bulk of said minor portion by the stripping medium upon admission of the admixture into the upper portion of said vessel, an outlet passage from the upper portion of the vessel at a point substantially opposite said inlet passage for discharging therefrom the admixed vapors of said minor portion and said stripping medium, mist-extractor means disposed in the upper portion of said vessel between said inlet and outlet passages, means for accumulating a body of unvaporized residue in the lower portion of said vessel, and outlet means for discharging the unvaporized residue of said minor portion from said vessel.

4. In an absorption recovery system including an absorber and a still between which a stream of an absorption menstruum is circulated in the operation of the system, apparatus for continuously purifying the circulating menstruum, comprising, a vertically disposed generally tubular vessel having a closed upper end, an inlet passage into the upper portion of the vessel adjacent said closed upper end, conduit means communicating with the inlet passage, means for introducing a hot vaporous stripping medium into said conduit means, means for continuously introducing a minor portion of said stream of absorption menstruum into said conduit means into direct admixture with said stripping medium, means for regulating the relative volumes of said minor portion of the menstruum and said stripping medium to such as will effect vaporization of the bulk of said minor portion by the stripping medium upon admission of the admixture into the upper portion of said vessel, an outlet passage from the upper portion of the vessel at a point substantially opposite said inlet passage for discharging therefrom the admixed vapors of said minor portion and said stripping medium, mist-extractor means disposed in the upper portion of said vessel between said inlet and outlet passages, means for accumulating a body of unvaporized residue in the lower portion of said vessel, closed reboiler means in the lower portion of the vessel, means for circulating heating medium through the reboiler means, and outlet means for discharging the unvaporized residue of said minor portion from said vessel.

5. An absorption oil purifier, comprising, a vertically disposed generally tubular casing having a closed upper end, inlet and outlet passages communicating with the upper portion of the vessel at points adjacent said closed upper end and substantially opposite each other, mixing means exteriorly of the casing connected to said inlet passage, first conduit means for admitting a heated vaporous stripping medium to said mixing means, a second conduit for supplying absorption oil to said mixing means, mist extractor means interiorly of the upper portion of the casing connected to said inlet passage, a drain pipe connected to the mist extractor means and extending downwardly in the casing, a closed coil-type heater extending longitudinally into the interior of the casing from the lower end thereof, liquid level regulating means for maintaining a body of liquid in the casing at a predetermined level to fully submerge said heater and the lower end of said drain pipe, and for continuously discharging excess liquid from said body of liquid.

6. An absorption oil purifier, comprising, a vertically disposed generally tubular vessel having a closed upper end, inlet and outlet nozzles communicating with the upper portion of the vessel at points adjacent said closed upper end and substantially opposite each other, a diffuser device connected to said inlet nozzle exteriorly of the vessel, said diffuser device comprising a conduit section having internal baffling, a first conduit means connected to the outer end of said diffuser device for supplying a heated vaporous stripping medium thereto, a second conduit means for supplying absorption oil to said mixing device for direct admixture therein with said vaporous stripping medium, mist extractor means in the upper portion of the vessel connected to said inlet nozzle, a drain pipe connected to the mist extractor means and extending downwardly in the vessel for delivering unvaporized liquid separating in the mist extractor means into the lower portion of the vessel, a closed coil-type heater extending longitudinally into the interior of the vessel from the lower end thereof, liquid level regulating means for maintaining a body of said liquid in the vessel at a predetermined level to fully submerge said heater and the lower end of said drain pipe, said regulating means being automatically actuatable by increases in the level of said body of liquid to discharge the excess liquid from the vessel.

7. An absorption oil purifier, comprising, a vertically disposed generally tubular vessel having a closed upper end, inlet and outlet nozzles communicating with the upper portion of the vessel at points adjacent said closed upper end and substantially opposite each other, a diffuser device connected to said inlet nozzle exteriorly of the vessel, said diffuser device comprising a conduit section having internal baffling, a first conduit means connected to the outer end of said diffuser device for supplying a heated vaporous stripping medium thereto, a second conduit means for supplying absorption oil to said mixing device for direct admixture therein with said vaporous stripping medium, means in said second conduit for regulating the volume of said absorption oil supplied to said mixing device, mist extractor means in the upper portion of the vessel connected to said inlet nozzle, a drain pipe connected to the mist extractor means and extending downwardly in the vessel for delivering unvaporized liquid separating in the mist extractor means into the lower portion of the vessel, a closed coil-type heater extending longitudinally into the interior of the vessel from the lower end thereof, liquid level regulating means for maintaining a body of said liquid in the vessel at a predetermined level to fully submerge said heater and the lower end of said drain pipe, said regulating means being automatically actuatable by increases in the level of said body of liquid to discharge the excess liquid from the vessel.

References Cited in the file of this patent
UNITED STATES PATENTS

| | | |
|---|---|---|
| 1,751,182 | Wilson | Mar. 18, 1930 |
| 1,784,561 | Watts et al. | Dec. 9, 1930 |
| 1,898,579 | Gard | Feb. 21, 1933 |
| 2,196,878 | Stover | Apr. 9, 1940 |
| 2,319,750 | Schonberg et al. | May 18, 1943 |
| 2,690,989 | Bottenberg | Oct. 5, 1954 |
| 2,762,831 | Hujsak | Sept. 11, 1956 |